United States Patent [19]
Wagner

[11] Patent Number: 6,142,424
[45] Date of Patent: *Nov. 7, 2000

[54] METHOD OF STEERING A VEHICLE AND VEHICLE ALLOWING IMPLEMENTATION OF THE METHOD

[75] Inventor: Alain Wagner, Le Chesnay, France

[73] Assignee: Aerospatiale Societe Nationale Industrielle, Paris, France

[ * ] Notice: Under 35 U.S.C. 154(b), the term of this patent shall be extended for 417 days.

[21] Appl. No.: 08/583,481

[22] Filed: Jan. 5, 1996

[30] Foreign Application Priority Data

Jan. 10, 1995 [FR] France ................................. 95 00180

[51] Int. Cl.⁷ ........................................ B64G 1/40
[52] U.S. Cl. ..................... 244/172; 244/158 R; 102/377
[58] Field of Search ............................... 244/158 R, 161, 244/172; 102/377, 37 E, 351

[56] References Cited

U.S. PATENT DOCUMENTS

| | | |
|---|---|---|
| 3,260,204 | 7/1966 | Wilkey, Jr. ............................. 102/378 |
| 3,384,016 | 5/1968 | Blanchard, Jr. ......................... 102/378 |
| 3,534,686 | 10/1970 | Watson . |
| 3,652,042 | 3/1972 | Welther ............................. 244/158 R |
| 3,907,225 | 9/1975 | Welther . |
| 5,178,347 | 1/1993 | Johnson et al. ...................... 244/158 R |
| 5,305,974 | 4/1994 | Willis ..................................... 244/172 |

FOREIGN PATENT DOCUMENTS

| | | |
|---|---|---|
| 0 409 711 A1 | 1/1991 | European Pat. Off. . |
| 1499209 | 7/1966 | France . |
| 1220994 | 1/1971 | United Kingdom . |

*Primary Examiner*—Galen L. Barefoot
*Attorney, Agent, or Firm*—Fisher, Christen & Sabol

[57] ABSTRACT

The invention relates to a method of steering a vehicle, as well as to said vehicle allowing the method to be implemented.

The method of steering such a vehicle including a propulsion system (2) and a jettisonable nose cone (8) containing a payload is noteworthy, according to the invention, in that, during the trajectory of said vehicle, the propulsion thrust of said vehicle (1) is temporarily interrupted in order to allow said jettisonable nose cone (8) to be ejected.

9 Claims, 3 Drawing Sheets

METHOD OF STEERING A VEHICLE AND VEHICLE ALLOWING IMPLEMENTATION OF THE METHOD

The present invention relates to a method of steering a vehicle, such as a launcher, missile or the like, as well as to said vehicle allowing the method to be implemented.

It is known that certain vehicles comprise a jettisonable nose cone arranged at the front of said vehicle and enclosing a payload, such as a satellite for example. The nose cone provides protection for the payload, until it is jettisoned out of the vehicle in order then to allow expulsion of the payload when said vehicle arrives at a given point on its trajectory.

At the present time, since the vehicle is constantly subjected to the thrust developed by the propulsion system and, therefore, to acceleration, the nose cone has to be ejected outside the trajectory of the vehicle, that is to say transversely thereto. To do that, the nose cone is then produced in several parts, and fairly often consists of two half-shells which are assembled longitudinally and between which a complex pyrotechnic device is provided for ejecting the nose cone. Hence, when the propelled vehicle arrives at the point of jettisoning the nose cone, the pyrotechnic device is initiated, which causes separation of the two-half shells on either side of the vehicle, transversely to its trajectory.

Although giving satisfactory results, the production of the nose cone, in the form of transversely separable pieces, made necessary by the continuous thrust developed by the propulsion system of the vehicle, and in order not to impede the vehicle in its progress, proves to be technically complex and, moreover, its pyrotechnic device dictates operational safety constraints, for example leaktightness with respect to the payload in order not to damage it at the moment when it is fired.

The object of the present invention is to remedy these drawbacks.

To this end, the method of steering a vehicle such as a launcher, missile and the like, of the type including a propulsion system and a jettisonable nose cone enclosing a payload, is noteworthy, according to the invention, in that, during the trajectory of said vehicle, the propulsion thrust of said vehicle is temporarily interrupted in order to allow said jettisonable nose cone to be ejected.

Thus, by virtue of this temporary thrust interruption which corresponds, for the technicians, to a phase of ballistic flight by said vehicle, it is possible to use an advantageously single-piece nose cone which can easily be ejected, since the acceleration of the vehicle is then zero. The invention consequently makes it possible to dispense with the usual nose cones consisting of multiple pieces and of integrated pyrotechnic systems, which reduces the complexity of production of said nose cones and thus diminishes the risks of accident and the cost of such vehicles.

Advantageously, after the temporary thrust interruption, said vehicle is oriented out of the direction of its trajectory in order to eject said nose cone forward, then said vehicle is reoriented into the direction of its trajectory in order to make said propulsion system operate again.

Moreover, the propulsion system of said vehicle generally consists of a plurality n of propulsion stages, the last of which carries said jettisonable nose cone. It is possible to achieve the temporary thrust interruption between the extinction of one stage and the ignition of the following stage of the propulsion system. By way of example, the temporary thrust interruption can be carried out after the extinction of the n−1 propulsion stage and before the ignition of the last propulsion stage n carrying said nose cone.

It is also possible to achieve the temporary thrust interruption by extinction then ignition of the propulsion stage or of any one of said propulsion stages according to whether said system consists of one or more propulsion stages.

The invention also relates to a vehicle of the type including a propulsion system and a nose cone which is jettisonable by ejection means and enclosing a payload. According to the invention, said nose cone is produced as a single piece and said means for ejecting said nose cone have a mechanical, elastic action in order to act when said propulsion system is temporarily interrupted, in accordance with the method above.

In one particular embodiment, said ejection means can be defined by springs making it possible, when they are decompressed, to impart an acceleration to said single-piece nose cone in order to expel it forward. For example, said ejection means are situated between said single-piece nose cone and an upper part of said vehicle which is linked, on the one hand, to said payload and, on the other hand, to said propulsion system.

Moreover, separable linking means externally unite said nose cone with said upper part and, when they are triggered, allow ejection of said nose cone by the action of said ejection means.

Moreover, motors are provided in said upper part in order to allow the latter to be oriented before and after the jettisoning of said single-piece nose cone, during the temporary interruption of thrust from said propulsion system.

The figures of the attached drawing will give a good understanding of how the invention can be produced. In these figures, identical references designate similar elements.

FIG. 1 diagrammatically represents an example trajectory of said vehicle with, in accordance with the invention, a phase of temporary interruption of its propulsion.

Figure 1:
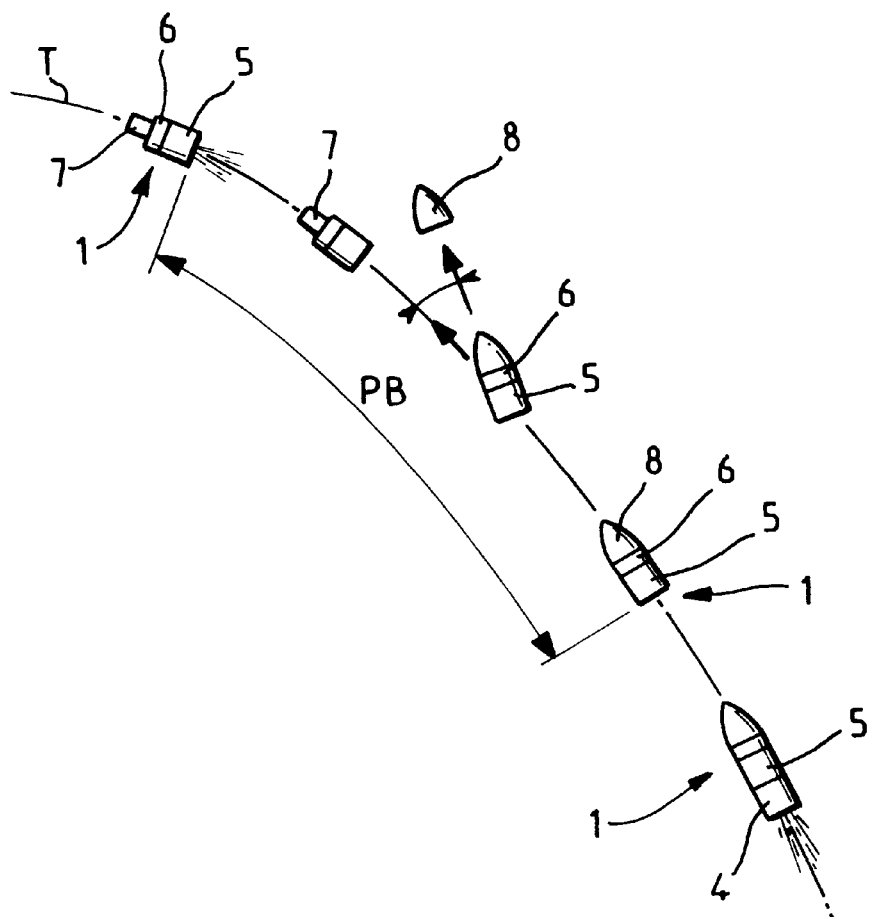

In the embodiment illustrated in FIG. 1, the vehicle 1 corresponds to a launcher and comprises a propulsion system 2 which consists, in this example, of three propulsion stages 3, 4 and 5, and an upper part 6 which carries a payload 7, such as a satellite, and with which is associated a protective nose cone 8 enclosing the satellite 7. The latter is intended to be placed into a desired orbit by the action of the propulsion system 2, along the trajectory T indicated.

According to the invention, the method of steering the launcher 1 consists in temporarily interrupting the thrust delivered by the propulsion system 2 in order to allow ejection of the jettisonable nose cone 8. For example, after the separation of the first propulsion stage 3, then of the second propulsion stage 4, the propulsion system of the launcher is interrupted, that is to say that the third propulsion stage 5 is not immediately ignited after the combustion, then the separation of the second stage from said third stage.

The launcher 1, then consisting of the upper part 6 equipped with its nose cone 8, and of the third stage 5, follows the predetermined trajectory T but with zero acceleration, so that it is in a ballistic phase during which it is subjected only to the force of gravity. This thrust interruption implying a ballistic phase represented by PB in FIG. 1, is advantageously taken advantage of to jettison the protective nose cone 8, which can then be done by mechanically simple ejection means 10, as will be seen below. This is because, since the launcher in this ballistic phase undergoes no acceleration, it is possible to impart a slight acceleration to the nose cone via the abovementioned ejection means, so that it moves away from the upper part, forward thereof. Hence it is possible to use a single-piece protective nose cone 8.

Figure 2:
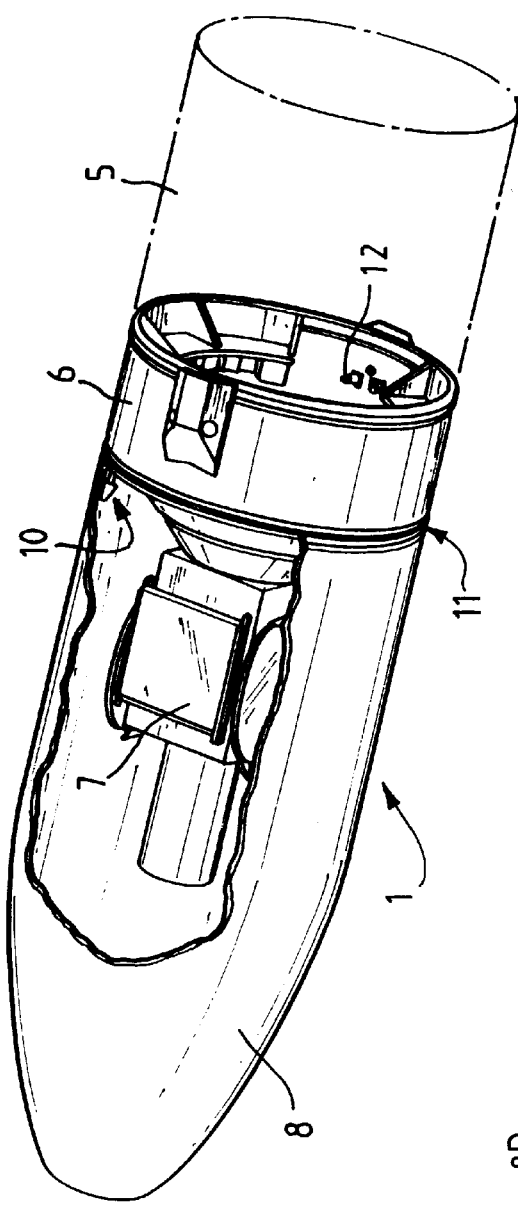
FIG. 2 shows the upper part of said vehicle, in partially cutaway perspective, provided with the jettisonable nose cone.

Structurally, in FIG. 2 can be seen the upper part 6 of the launcher which, on the one hand, extends the third and last propulsion stage 5, represented in dots and dashes, and which, on the other hand, carries the satellite 7 to be placed into orbit.

The upper part 6 and the nose cone 8, both of cylindrical shape, are linked to one another by separable or breakable linking means 11 which are defined, in a known way, by a peripheral external strap 11A holding external annular shoulders 6A and 8A against one another, these shoulders provided respectively on the upper part 6 and the nose cone 8. These means 11 also comprise a controllable pyrotechnic charge, not represented, which makes it possible to snap the strap 11A and thus to unfasten the nose cone from the upper part. Similar means combine the upper part with the third and last stage 5. Motors 12 are additionally provided in the upper part 6, particularly to provide for taking up dispersions and for three-axis stabilization of the upper part. These motors 12 are advantageously used to orient the launcher before and after the jettisoning of the nose cone during the ballistic phase PB, as will be seen later.

Figure 3:
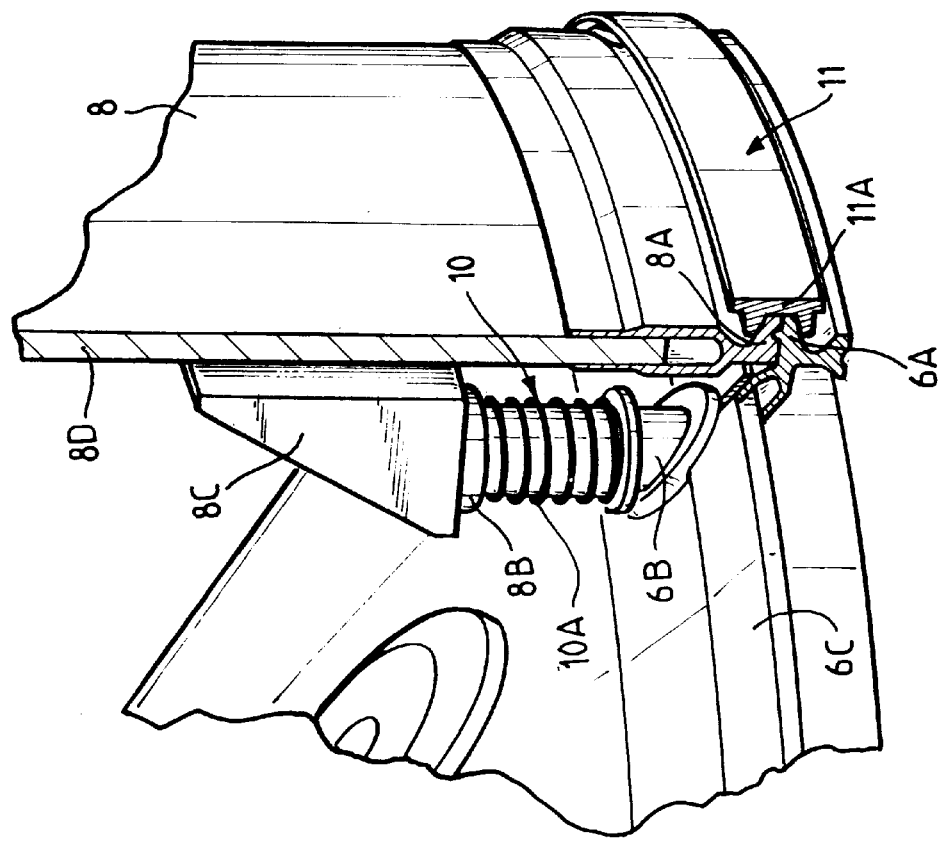
FIG. 3 represents, in perspective, the means of ejecting the nose cone, in inactive position, before breaking of the linking means linking the nose cone to the upper part of said vehicle.

The means 10 for ejecting the nose cone with respect to the upper part are represented more particularly in FIG. 3. They have a mechanical and elastic action, and are defined by springs 10A which are equally distributed in angle from one another with respect to the longitudinal axis of the upper part/nose cone assembly. These springs 10A are provided in the vicinity of the periphery of this assembly and, on the one hand, they are partially engaged, for the purposes of guiding and holding, in-pins 6B provided projecting from the body 6C of the upper part and, on the other hand, they are accommodated in rings 8B provided in lugs 8C which are fixed within the single-piece cylindrical body 8D forming the nose cone 8.

The springs 10A are in compressed position when the upper part 6 and the nose cone 8 are held assembled by the linking strap 11A.

When the launcher 1 enters the ballistic flight phase PB of its trajectory T, for which the propulsion stage 5 is inactive, the operation of jettisoning the single-piece nose cone 8 is carried out. To do that, the launcher is oriented in angle into a different direction from that of the trajectory T, for example by an angle of 20° out of the plane of the trajectory, by the action of motors 12 situated in the upper part 6. In that way, the launcher is moved sideways along the trajectory T, as shown in FIG. 1. During this movement, the linking means 11 are initiated and break the strap 11A by the pyrotechnic charge which unfastens the nose cone 8 from the upper part 6.

Figure 4:
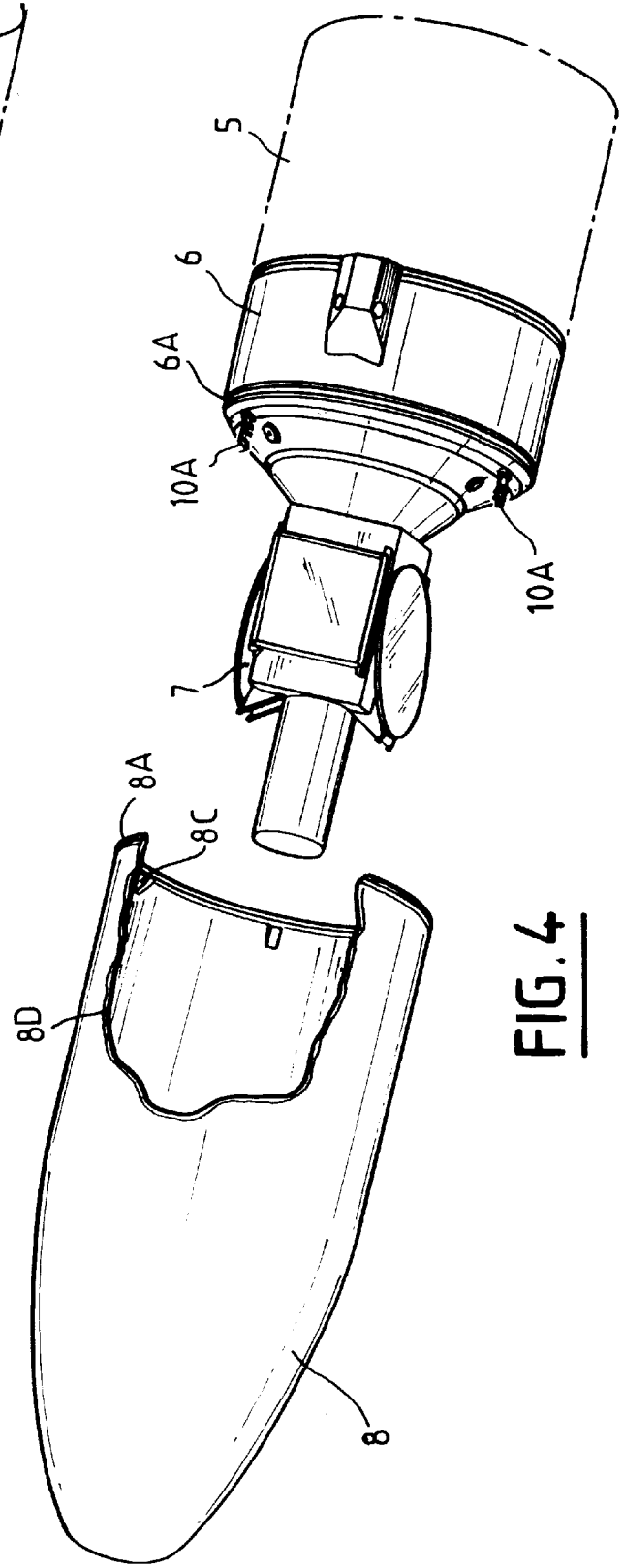
FIG. 4 shows, in partially cutaway perspective, the separation of the nose cone from said upper part by said ejection means.
Figure 5:
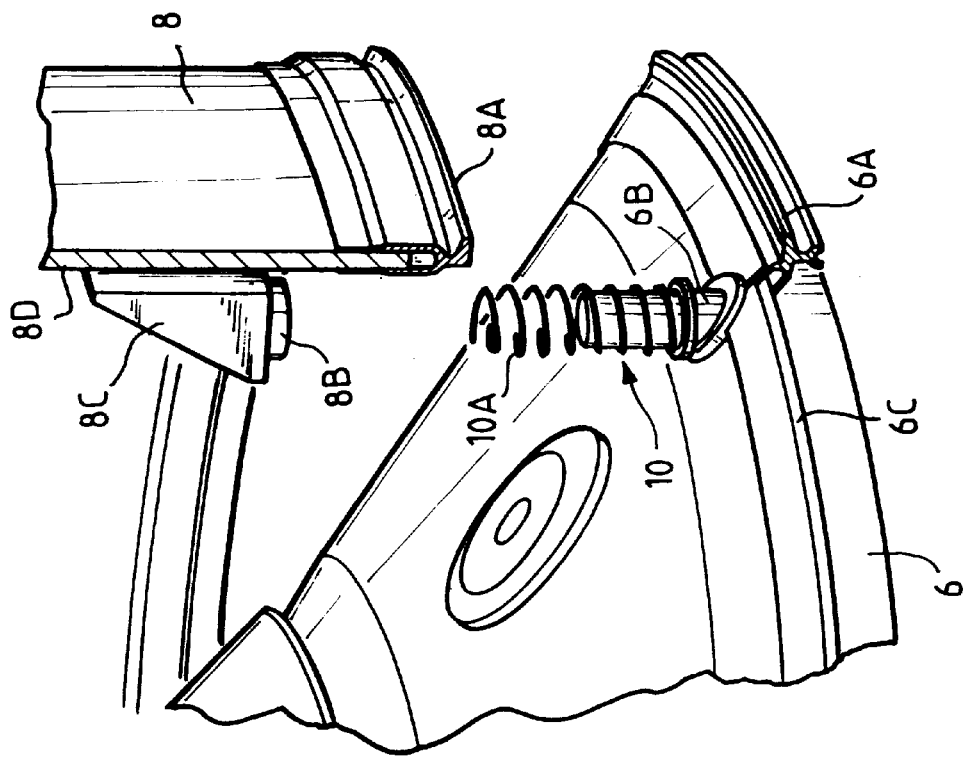
FIG. 5 represents, in perspective, the ejection means in active position ejecting said nose cone, after breaking of the linking means.

At this moment, the initially compressed springs 10A extend and impart an acceleration to the single-piece nose cone which is sufficient to eject it forward, as FIGS. 4 and 5 show. By virtue of the angular orientation of the launcher with respect to its trajectory, the nose cone jettisoned forward does not risk impeding it in its progress.

The launcher 1, then consisting of the third stage 5 and of the upper part 6 carrying the satellite 7 is then reoriented by the motors 12 into the plane of its trajectory T, in the optimal direction. Then the third propulsion stage 5 is ignited putting an end to the ballistic phase PB and allowing the launcher to carry on with its flight up to the desired orbit.

Thus, by virtue of the artificial and temporary introduction of a ballistic flight phase in the course of the trajectory of the vehicle, a single-piece nose cone can be envisaged so as to eject it from the vehicle by simple mechanical means supplying even a slight acceleration. This ballistic flight phase, introduced in this example between the last and the penultimate stages, can last less than 60 seconds without significantly impairing the flight of the vehicle.

What is claimed is:

1. A method for bringing a payload (7) to a desired orbit, by means of a vehicle (1) comprising a propulsion system (2) generating a propulsion thrust and a part (6) supporting said payload (7) and a separable protective nose cone (8) covering and protecting said payload, said method comprising the steps of:
   producing said protective nose cone (8) as a single piece;
   interrupting said propulsion thrust, when said vehicle is describing its trajectory;
   propulsion thrust interruption; and
   after ejection of said protective nose cone (8), reestablishing said propulsion thrust in order to bring said payload up to said desired orbit.

2. The method as claimed in claim 1, wherein, during the temporary thrust interruption, said vehicle (1) is oriented out of the direction of its trajectory in order to eject said nose cone (8) forward, then said vehicle is reoriented into the direction of its trajectory in order to make said propulsion system (2) operate again.

3. The method as claimed in claim 1, of the type in which the propulsion system (2) of said vehicle consists of a plurality n of propulsion stages, the last of which carries said jettisonable nose cone (8), wherein the temporary thrust interruption is achieved between the extinction of one stage and the ignition of the following stage of the propulsion system.

4. The method as claimed in claim 3, wherein the temporary thrust interruption is carried out after the extinction of the n−1 propulsion stage and before the ignition of the last propulsion stage n carrying said nose cone.

5. The method as claimed in claim 1, of the type in which the propulsion system (2) of said vehicle consists of at least one propulsion stage, wherein the temporary thrust interruption is achieved by extinction, then ignition of said propulsion stage.

6. A vehicle, such as a launcher, missile or the like, of the type including a propulsion system (2) and a nose cone (8) which is jettisonable by ejection means and enclosing a payload, and intended for implementing the method defined under claim 1, wherein said nose cone (8) is a single-piece nose cone and wherein said means (10) for ejecting said nose cone are formed by springs (10A) which are equally distributed in angle about the longitudinal axis of said nose cone (8) making it possible, when they are extended, to impart an acceleration to said single-piece nose cone (8) in order to expel it forward.

7. The vehicle as claimed in claim 6, wherein said ejection means (10) are situated between said single-piece nose cone (8) and an upper part (6) of said vehicle which is linked, on the one hand, to said payload (7) and, on the other hand, to said propulsion system (2).

8. The vehicle as claimed in claim 7, wherein separable linking means (11) externally unite said nose cone (8) with said upper part (6) and, when they are triggered, allow ejection of said nose cone by the action of said ejection means (10).

9. The vehicle as claimed in claim 7, wherein motors (12) are provided in said upper part (6) in order to allow the latter to be oriented before and after the jettisoning of said single-piece nose cone (8), during the temporary interruption of thrust from said propulsion system (2).

* * * * *